United States Patent
Moretti et al.

(10) Patent No.: US 12,123,382 B2
(45) Date of Patent: Oct. 22, 2024

(54) PRESSURE DAMPING DEVICE FOR A FLUID CIRCUIT

(71) Applicant: HUTCHINSON, Paris (FR)

(72) Inventors: Nicola Moretti, Gassino Torinese (IT); Clément Bret, Turin (IT); Olivier Tanneau, Saint Ouen (FR); Kevin Adam, Langueux (FR)

(73) Assignee: HUTCHINSON, Paris (FR)

( * ) Notice: Subject to any disclaimer, the term of this patent is extended or adjusted under 35 U.S.C. 154(b) by 0 days.

(21) Appl. No.: 18/185,887

(22) Filed: Mar. 17, 2023

(65) Prior Publication Data

US 2023/0323844 A1    Oct. 12, 2023

(30) Foreign Application Priority Data

Mar. 24, 2022 (FR) .................... 2202642

(51) Int. Cl.
| | |
|---|---|
| *F02M 55/04* | (2006.01) |
| *F02M 37/00* | (2006.01) |
| *F02M 69/46* | (2006.01) |
| *F16K 7/17* | (2006.01) |
| *F16K 17/04* | (2006.01) |
| *F16L 55/053* | (2006.01) |

(52) U.S. Cl.
CPC ........ *F02M 37/0041* (2013.01); *F02M 55/04* (2013.01); *F02M 69/462* (2013.01); *F16K 7/17* (2013.01); *F16K 17/0453* (2013.01); *F16L 55/053* (2013.01); *F02M 2200/315* (2013.01)

(58) Field of Classification Search
CPC .. F02M 37/0041; F02M 55/04; F02M 69/462; F02M 2200/315; F02M 69/54; F16K 7/17; F16K 17/0453; F16K 47/02; F16K 7/123; F16L 55/053

USPC .................. 123/506, 457, 459; 251/331
See application file for complete search history.

(56) References Cited

U.S. PATENT DOCUMENTS 2,407,761 A * 9/1946 McPherson ........... F16K 31/402
251/30.02
2,577,967 A * 12/1951 Hughes ................. F16K 31/365
123/179.17

(Continued)

FOREIGN PATENT DOCUMENTS

DE    102006061690 A1 *  7/2008 ........... F02M 55/002
EP        3532722 A1       9/2019

(Continued)

OTHER PUBLICATIONS

French Search Report received for French Serial No. 2202642 on Nov. 3, 2022, 2 pgs.

*Primary Examiner* — George C Jin
*Assistant Examiner* — Teuta B Holbrook
(74) *Attorney, Agent, or Firm* — Merchant & Gould P.C.

(57) ABSTRACT

A pressure damping device for a fluid circuit includes a lower body having a fluid inlet port and a fluid outlet port. An upper cover attaches to the body. An elastically deformable membrane is interposed between the body and the cover, and a circular cup is arranged on the membrane. A spring is interposed between the cup and a bottom of the cover. The body includes a support member for supporting the membrane, with the support member projecting from the first bottom and including a free upper end on which the membrane is adapted to be supported.

20 Claims, 9 Drawing Sheets

(56) References Cited

U.S. PATENT DOCUMENTS

| | | | | |
|---|---|---|---|---|
| 3,379,406 A * | | 4/1968 | Greer | F16K 31/402 251/333 |
| 3,628,573 A * | | 12/1971 | Loliger | F16L 55/053 137/593 |
| 3,762,681 A * | | 10/1973 | McKinney | F16K 7/17 251/61.1 |
| 3,948,288 A * | | 4/1976 | Mayer | F16L 55/053 138/30 |
| 4,043,332 A * | | 8/1977 | Metcalf | A61M 5/168 604/141 |
| 4,163,461 A * | | 8/1979 | Jacobellis | F16L 55/053 138/30 |
| 4,175,590 A * | | 11/1979 | Grandclement | F16K 31/404 251/366 |
| 4,221,361 A * | | 9/1980 | Weingarten | F16K 11/207 137/883 |
| 4,370,102 A * | | 1/1983 | Sasaki | F02M 37/08 137/506 |
| 4,373,872 A * | | 2/1983 | Kemmner | F02M 37/0041 138/30 |
| 4,596,219 A * | | 6/1986 | Kemmner | F02M 37/0041 123/457 |
| 4,625,695 A * | | 12/1986 | Tuckey | F02M 37/0029 92/97 |
| 4,630,642 A * | | 12/1986 | Detweiler | F02M 25/0225 137/506 |
| 4,649,884 A * | | 3/1987 | Tuckey | F02M 69/465 123/457 |
| 4,679,537 A * | | 7/1987 | Fehrenbach | F02M 55/04 138/30 |
| 4,683,864 A * | | 8/1987 | Bucci | F02M 37/0052 123/514 |
| 4,936,342 A * | | 6/1990 | Kojima | F02M 69/54 251/126 |
| 4,996,963 A * | | 3/1991 | Fehrenbach | F02M 69/54 138/30 |
| 5,076,320 A * | | 12/1991 | Robinson | G05D 16/024 137/454.2 |
| 5,161,864 A * | | 11/1992 | Cardenas | B60T 8/42 138/30 |
| 5,435,345 A * | | 7/1995 | Robinson | F02M 69/54 251/86 |
| 5,458,104 A * | | 10/1995 | Tuckey | F02D 33/003 123/463 |
| 5,469,829 A * | | 11/1995 | Kleppner | F02M 37/106 123/514 |
| 5,505,181 A * | | 4/1996 | McRae | F02M 55/002 123/456 |
| 5,509,390 A * | | 4/1996 | Tuckey | F02M 37/0035 123/497 |
| 5,520,215 A * | | 5/1996 | Haboush | G05D 16/02 251/48 |
| 5,542,453 A * | | 8/1996 | Gabas | B60T 11/26 220/721 |
| 5,590,631 A * | | 1/1997 | Tuckey | F02M 37/0041 123/456 |
| 5,794,597 A * | | 8/1998 | Schwegler | F02M 37/106 123/514 |
| 5,967,120 A * | | 10/1999 | Blanton | F02M 69/54 123/514 |
| 6,032,651 A * | | 3/2000 | Field | F02M 69/465 138/30 |
| 6,135,092 A * | | 10/2000 | Schaenzer | F02M 69/465 123/456 |
| 6,295,918 B1 * | | 10/2001 | Simmons | F04B 43/02 92/98 R |
| 6,336,442 B1 * | | 1/2002 | Kilgore | F02M 37/0017 123/456 |
| 6,430,928 B1 * | | 8/2002 | Iyer | F16L 55/041 60/592 |
| 6,843,232 B2 * | | 1/2005 | Keesee | F02M 69/54 123/457 |
| 6,901,964 B2 * | | 6/2005 | Kippe | F16L 55/053 138/30 |
| 7,581,712 B2 * | | 9/2009 | Yoshino | F16K 7/16 251/61 |
| 7,789,071 B2 * | | 9/2010 | Akita | F02M 69/046 123/456 |
| 7,870,871 B1 * | | 1/2011 | Hanjagi | F02M 37/0041 220/721 |
| 8,397,696 B2 * | | 3/2013 | Hanjagi | F02M 55/04 123/456 |
| 8,517,050 B2 * | | 8/2013 | Akagi | G05D 16/0655 123/514 |
| 8,695,571 B2 * | | 4/2014 | Suzuki | F02M 37/0029 137/496 |
| 9,964,026 B2 * | | 5/2018 | Schumnig | F02B 37/14 |
| 10,570,968 B2 * | | 2/2020 | Kim | F16K 17/18 |
| 10,890,145 B2 * | | 1/2021 | Pujol | F16L 55/053 |
| 11,137,080 B2 * | | 10/2021 | Williams | F16K 7/123 |
| 2005/0034710 A1 * | | 2/2005 | Crary | F02M 37/0029 123/457 |
| 2005/0139277 A1 * | | 6/2005 | Baltes | F15B 1/12 138/30 |
| 2005/0205815 A1 * | | 9/2005 | Frenkel | F16K 7/126 251/61.1 |
| 2006/0039812 A1 * | | 2/2006 | Agui | F16L 55/053 417/540 |
| 2015/0219233 A1 * | | 8/2015 | Ringer | F16K 37/0025 137/535 |
| 2015/0369378 A1 * | | 12/2015 | Umeyama | G05D 7/0635 137/486 |
| 2017/0350354 A1 * | | 12/2017 | Ostrosky | F16L 55/055 |
| 2019/0271285 A1 * | | 9/2019 | Benanti | F16L 55/053 |

FOREIGN PATENT DOCUMENTS

| | | | | |
|---|---|---|---|---|
| FR | 2721354 A1 | | 12/1995 | |
| FR | 3012849 A1 | * | 5/2015 | F02M 37/0041 |
| WO | WO-2004022994 A2 | * | 3/2004 | F16D 25/12 |
| WO | 2011097124 A1 | | 8/2011 | |
| WO | 2018078504 A1 | | 5/2018 | |

* cited by examiner

[Fig.1]
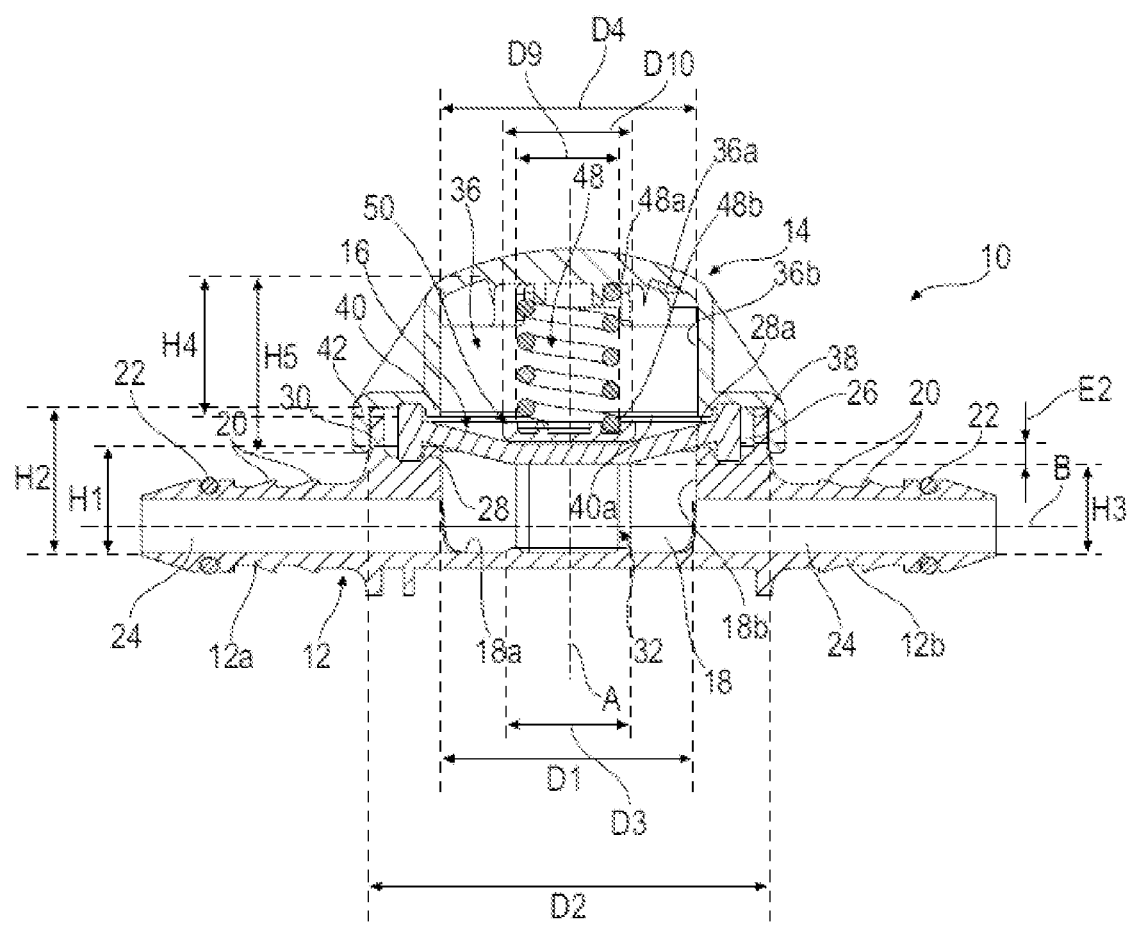

[Fig.2]
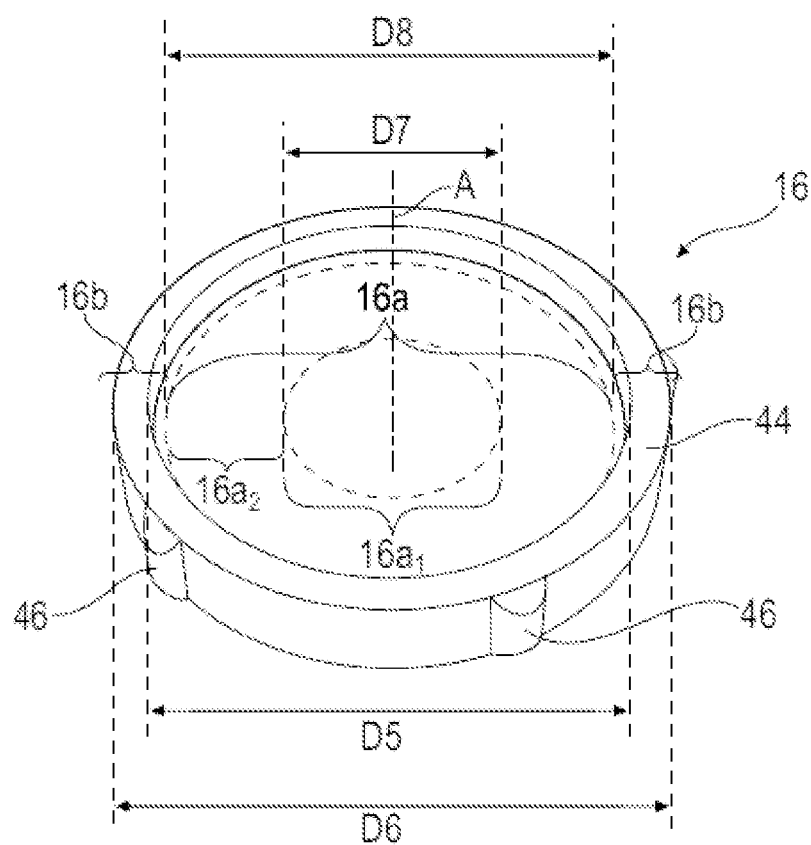

[Fig.3]
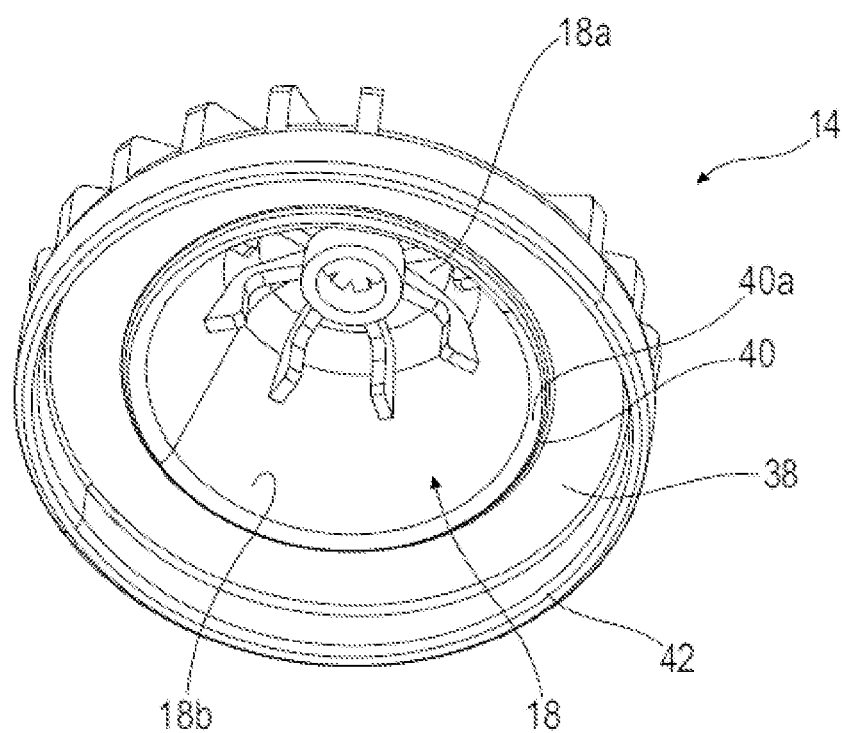

[Fig.4]
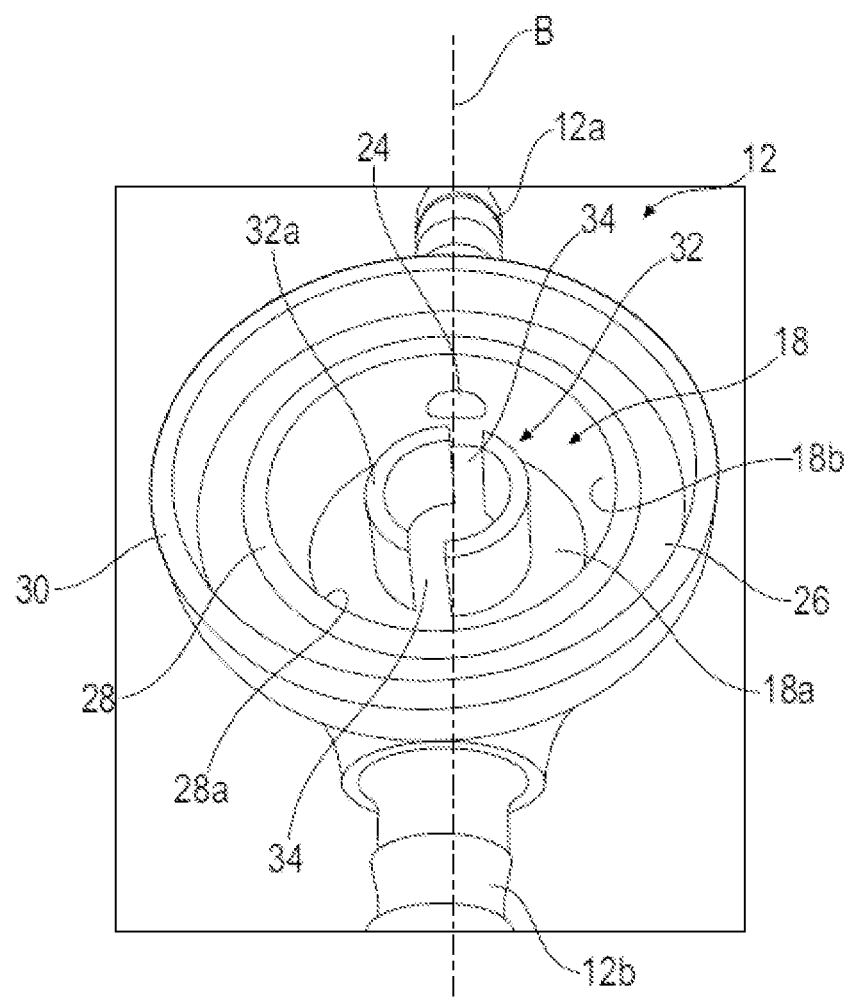

[Fig.5]
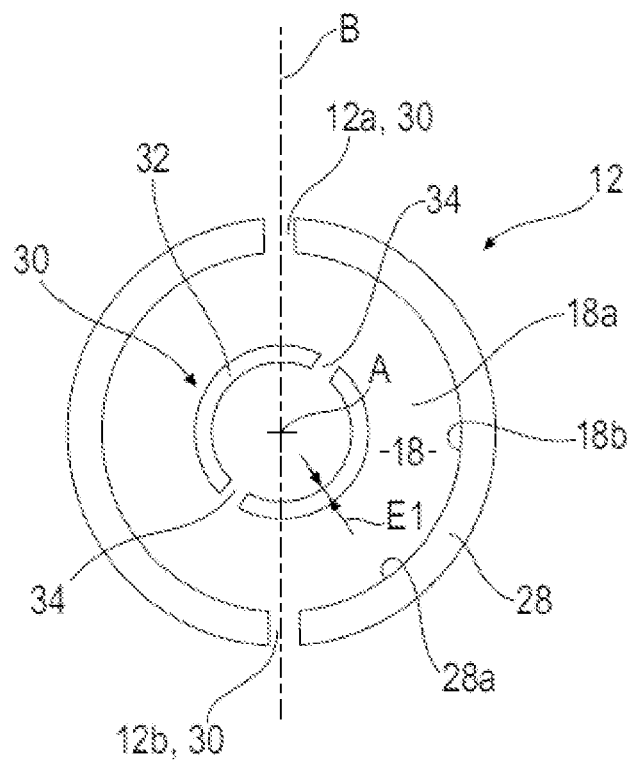

[Fig.6]
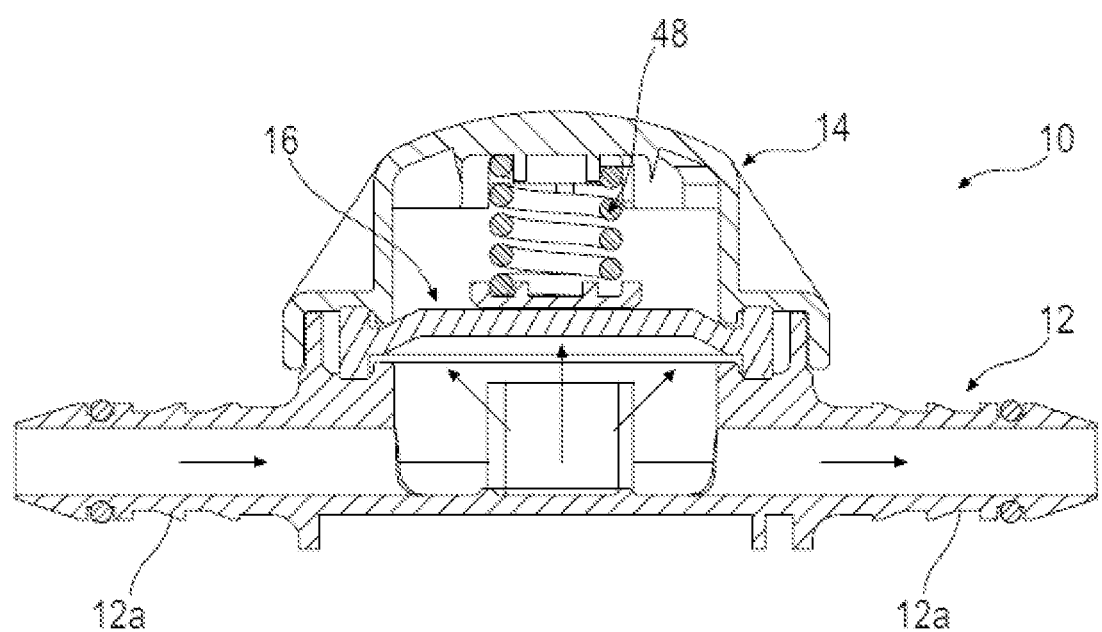

[Fig.7]
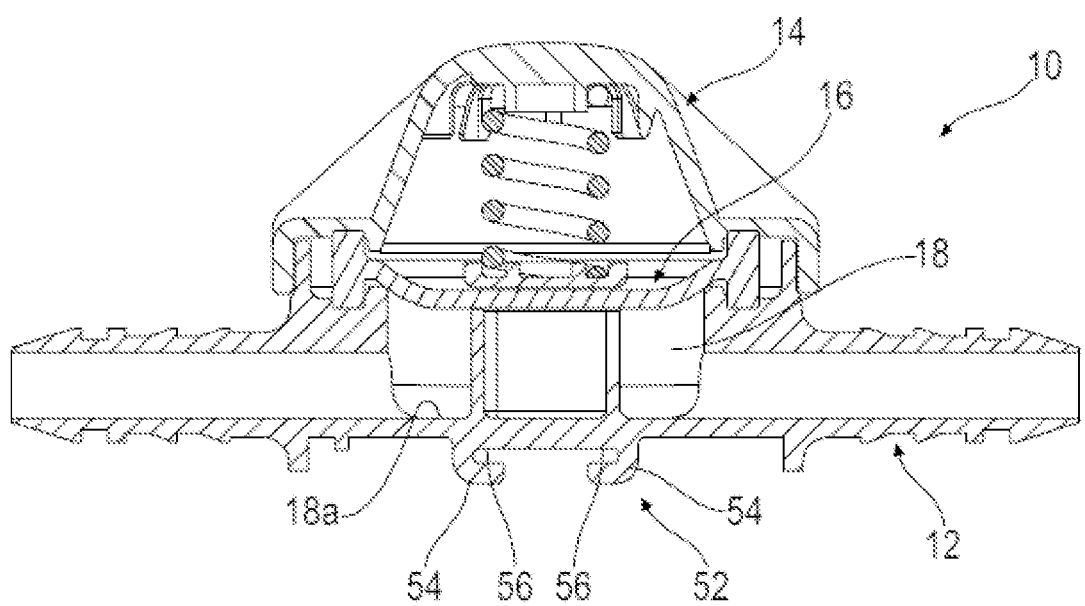

[Fig.8]
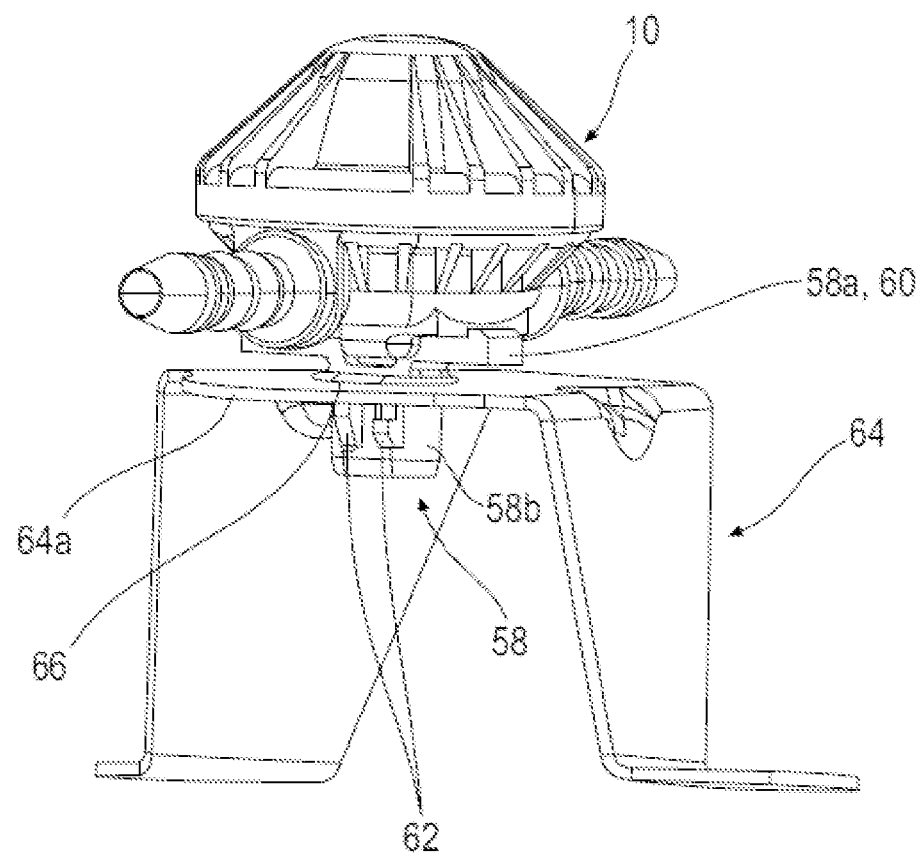

[Fig.9]
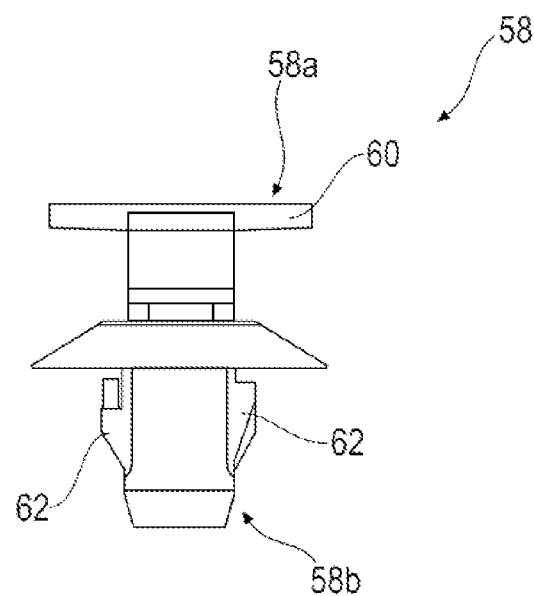

PRESSURE DAMPING DEVICE FOR A FLUID CIRCUIT

CROSS-REFERENCE TO RELATED APPLICATION

This U.S. patent application claims the benefit of French Application No. 2202642 filed with the French Patent Office on Mar. 24, 2022, the entire contents of which is incorporated herein by reference.

TECHNICAL FIELD OF THE INVENTION

The present invention relates to a pressure damping device for a fluid circuit, and in particular for a fuel circuit for a vehicle.

BACKGROUND OF THE INVENTION

The technical background comprises in particular the documents FR-A1-2 721 354, FR-A1-3 012 849 and WO-A1-2011/097124.

A pressure damping device for a fluid circuit, in particular a fuel circuit, is a device that allow for damping the pressure variations of a fluid in a circuit. In the case of a motor vehicle fuel circuit, this type of device allows to attenuate the pressure peaks of the fuel which are likely to generate vibratory and acoustic nuisances in the passenger compartment of the vehicle.

The document EP-A1-3 532 722 describes a pressure damping device for a fuel circuit, which comprises:
- a lower body comprising fuel inlet and outlet ports which are connected to a chamber located between the inlet and outlet ports,
- an upper cover attached to the body above the chamber, this cover comprising an internal cavity, and
- an elastically deformable membrane interposed between the body and the cover, the membrane having a peripheral portion clamped between the body and the cover to ensure a seal between the chamber and the cavity.

The elastic deformation capability of the membrane allows to attenuate the pressure peaks of fuel flowing through the chamber from the inlet port towards the outlet port.

In this device, the damping of the pressure is only achieved by this deformation capacity. This device can be used for a low pressure (typically less than 2 bar) or even high pressure (typically equal to or greater than 2 bar) fuel circuit.

When a damping device is intended for equipping a high-pressure circuit, it usually also comprises a spring which is housed in the cavity of the cover and which is supported on the membrane by means of a cup.

In this configuration, the stiffness of the spring and the deformability of the membrane together contribute to the damping of the pressure, allowing the device to be used in high-pressure circuits.

The present invention proposes an improvement to the current technique, which in particular allows to improve the damping efficiency of the device while limiting its overall dimension.

SUMMARY OF THE INVENTION

The invention relates to a pressure damping device for a fluid circuit, the device comprising:

- a lower body comprising fluid inlet and outlet ports which are connected to a chamber located between the inlet and outlet ports, the body being formed in one single piece and the chamber comprising a first bottom,
- an upper cover attached to the body above the chamber, this cover comprising an internal cavity with a second bottom oriented towards the first bottom of the chamber,
- an elastically deformable membrane interposed between the body and the cover, the membrane being generally circular in shape and comprising a central portion which has a constant thickness and a peripheral portion which is clamped between the body and the cover to ensure a seal between the chamber and the cavity,
- a circular cup arranged in the cavity and on the central portion of the membrane, and
- a spring interposed between the cup and the second bottom of the cavity, wherein the body comprises a support member for supporting the membrane, this support member projecting from the first bottom and comprising a free upper end on which the membrane is adapted to be supported, and in which:
- the member extends from the first bottom along a central axis to a height which is less than or equal to a height of the chamber, this member having a circular outline and having an external diameter D3 measured with respect to said axis,
- the cup is centred on said axis and has an external diameter D10 measured with respect to said axis, with $0.8 \times D3 < D10 < 1.2 \times D3$, and
- the membrane is centred on said axis and its peripheral portion has a clamping internal diameter D1 measured with respect to said axis, with $D1 > 1.5 \times D3$.

One of the particularities of the device according to the invention is its body, which is formed in one single piece with a support member for supporting the membrane. The height of this member is determined so that the membrane adopts a particular shape in the deformed state when it is supported on the upper end of this member. The membrane is supported by its lower face on the member and the cup is supported on the upper face of the membrane. The shape of the member is further determined to be simple and not bulky, which facilitates the manufacturing of the body and thus the device and limits the impact on the overall dimension of the device.

Another particularities of the invention concerns the ratio between the transverse dimensions of the member and the cup, on the one hand, and the transverse dimension of the membrane, and in particular its central portion, on the other. This ratio is determined so that a significant portion of the membrane is not supported on the member or the cup during operation and can freely deform elastically during operation, thereby allowing to optimise the damping of the pressure peaks. The larger the deformable area of the membrane, the greater the pressure damping can be.

When a low or high pressure fluid circulates through the device, a pressure is exerted on the membrane which will deform. The deformation of this membrane is limited by the spring. The spring compresses according to the pressure applied to the membrane. The effect of the deformation of the membrane and the spring allows a constant and autonomous regulation of the pressure variations within the circuit by punctual increase of the fluid volume, which implies a reduction of the noise present in the circuit.

The device according to the invention has the advantage of being compact and autonomous and of being able to operate at low temperature and high pressure.

The device according to the invention may comprise one or more of the following characteristics, taken alone or in combination with each other:
- the member has a generally tubular shape centred on said axis;
- the member comprises a tubular wall centred on said axis and having a radial thickness less than or equal to the thickness of the central portion of the membrane;
- the tubular wall comprises at least two radial notches;
- the notches are diametrically opposed and/or extend over the entire height of the member;
- the inlet and outlet ports are diametrically opposed with respect to said axis and aligned on another axis, said notches being offset with respect to this other axis;
- the membrane is constrained and deformed by the spring so as to comprise a first portion at the centre which is planar and is supported on said member, and a second portion around the first portion which is frustoconical;
- the cavity has an internal diameter D4 measured with respect to the axis, and the chamber has an internal diameter D3 measured with respect to the axis, with $0.8 \times D3 < D4 < 1.2 \times D3$;
- the cover comprises a first annular tooth for clamping the membrane, this first tooth comprising an inner peripheral edge located on the side of said axis, which is rounded and has a radius of curvature greater than 0.5 mm, preferably greater than or equal to 0.8 mm, and for example between 0.8 mm and 1 mm and/or the body comprises a second annular tooth for clamping the membrane, this second tooth comprising an inner peripheral edge located on the side of said axis, which is rounded and has a radius of curvature greater than 0.1 mm, preferably greater than or equal to 0.2 mm, and for example between 0.2 mm and 0.4 mm;
- the peripheral portion of the membrane comprises an annular allowance, an upper portion of which is received in an annular gorge of the cover and a lower portion of which is received in an annular gorge of the body;
- the peripheral portion of the membrane comprises lugs projecting radially outwards with respect to said axis, these lugs being distributed around this axis;
- the central portion of the membrane is planar in the unconstrained state (i.e. not biased by the spring or the fluid);
- the central portion of the membrane has a thickness of 1 mm or more, preferably 1.5 mm or more, and more preferably 2 mm or more;
- the membrane is made of FVMQ;
- the body comprises a slide system, the device further comprising a connection element which is formed in one single piece and comprises two attachment portions, the first attachment portion being configured to cooperate by sliding with the slide system of the body, and the second attachment portion comprising at least one elastic snap-fit tab;
- $D1 > 2 \times D3$;
- said height of the chamber is the maximum height of the chamber;
- the thickness of the member is less than 2 mm, and preferably less than or equal to 1.5 mm;
- D3 is between 5 and 30 mm, preferably between 10 and 20 mm, and more preferably between 10 and 15 mm;
- D1 is between 10 and 60 mm, preferably between 20 and 40 mm, and more preferably between 20 and 30 mm;
- D10 is between 5 and 30 mm, preferably between 10 and 20 mm, and more preferably between 10 and 15 mm;
- the cover is attached to the body by welding (i.e. by a weld bead), for example by heat welding or laser welding.

The present invention also relates to a fuel circuit for a vehicle, in particular a motor vehicle, comprising at least one device as described above.

BRIEF DESCRIPTION OF THE FIGURES

Further characteristics and advantages will be apparent from the following description of a non-limiting embodiment of the invention with reference to the appended drawings in which:

FIG. 1 is a schematic axial sectional view of a pressure damping device according to the invention, and illustrates this device in a non-functional state;

FIG. 2 is a schematic perspective view of a membrane of the device of FIG. 1;

FIG. 3 is a schematic perspective view of a cover of the device of FIG. 1;

FIG. 4 is a schematic perspective view of a body of the device of FIG. 1;

FIG. 5 is a schematic view showing a portion of the body of FIG. 4;

FIG. 6 is a similar view to FIG. 1 and shows the device being damped;

FIG. 7 is a similar view to FIG. 1 and illustrates a variant embodiment of the device;

FIG. 8 is a schematic perspective view of the device of FIG. 7 and a support plate for that device; and FIG. 9 is a schematic perspective view of a connection element of the device of FIG. 7 to the support plate of FIG. 8.

DETAILED DESCRIPTION OF THE INVENTION

FIGS. 1 to 6 illustrate a first embodiment of a pressure damping device 10 for a fluid circuit, such as fuel.

The device 10 comprises a lower body 12, an upper cover 14, and a membrane 16 interposed between the body 12 and the cover 14.

The body 12 is formed in one single piece and comprises a fluid inlet port 12a and a fluid outlet port 12b. The body 12 is, for example, injection-moulded from plastic.

The body 12 further comprises an internal chamber 18 which is connected to the ports 12a, 12b. The chamber 18 comprises a bottom 18a at its lower end with its upper end open.

In the example shown, the body 12 comprises a generally circular or cylindrical median portion with a main axis marked A (see FIGS. 1 and 4). The ports 12a, 12b project from this median portion and extend substantially radially with respect to the axis A. The ports 12a, 12b are here diametrically opposed with respect to the axis A. Furthermore, the ports 12a, 12b are here aligned on an axis B which is perpendicular to the axis A.

Each of the ports 12a, 12b comprises a tubular portion forming a male portion and configured to be sleevingly engaged into a female portion such as the free end of a pipe. Each of the ports 12a, 12b may comprise anchoring ribs 20 at their external periphery, in particular in the aforementioned pipe. Each of the ports 12a, 12b may be equipped with a seal 22 of the O-ring type for example.

The chamber 18 is generally circular or cylindrical in shape and has an internal diameter D1 (FIG. 5). The chamber 18 is defined by a cylindrical surface 18b of the body 12, into which internal passages 24 of the ports 12a, 12b open. It can be seen in FIG. 1 that the lower ends of these passages 24 are aligned with the bottom 18a of the chamber 18.

FIG. 4 shows that the body 12 comprises an annular gorge 26 at its upper end and around the chamber 18. The gorge 26 is centred on the axis A. This gorge 26 is delimited at its internal periphery by an annular tooth 28 and at its external periphery by a cylindrical rim 30.

The tooth 28 is centred on the axis A. The tooth 28 extends upwardly in a direction parallel to the axis A. The tooth 28 extends in the extension of the aforementioned surface 18b.

The tooth 28 has an internal diameter D1. Furthermore, the tooth 28 has a height H1 which is measured from the bottom 18a in a direction parallel to the axis A.

Advantageously, the tooth 28 comprises at its internal periphery an internal peripheral edge 28a which is convexly curved and has a radius of curvature greater than 0.1 mm and which is for example 0.3 mm.

The rim 30 is centred on the axis A. The rim 30 extends upwardly in a direction parallel to the axis A.

The rim 30 has an external diameter D2. Furthermore, the rim 30 has a height H2 which is measured from the bottom 18a in a direction parallel to the axis A.

In the example shown, H2 is greater than H1. Furthermore, D2 is greater than D1.

The body 12 further comprises a support member 32 for supporting the membrane 16. This member 32 projects from the bottom 18a and comprises a lower end connected to the bottom and an upper free end on which the membrane 16 is able to be supported.

The member 32 has a circular outline and has an external diameter D3 measured with respect to the axis A.

Advantageously, as in the example shown, the member 32 has a generally tubular shape centred on the axis A. The member 32 comprises a tubular wall 32a having a radial thickness E1. E1 is preferably less than 2 mm, and more preferably less than or equal to 1.5 mm.

The tubular wall 32a here comprises two radial notches 34. It can be seen in FIG. 4 that the notches 34 are diametrically opposed to each other.

The member 34 has a height H3 measured from the bottom 18a in a direction parallel to the axis A. In FIG. 1, it can be seen that H3 is less than or equal to the height of the chamber 18 defined by the height H1 of the tooth 30. In the case of a variable height chamber, H3 would preferably be less than or equal to the maximum height of the chamber.

It can also be seen in FIGS. 1 and 4 that the notches 34 extend over the entire height H3 of the member 32. The notches 32 are offset from the axis B of the inlet and outlet ports 12a, 12b. In other words, the notches 34 are not exactly aligned with the inlet and outlet ports 12a, 12b. This is particularly advantageous as it creates load losses in the flowing of the fluid between the inlet and outlet ports 12a, 12b, and thus helps to mitigate the pressure peaks.

The upper end of the member 32 extends in a plane substantially perpendicular to the axis A.

The cover 14 of the device 10 can be seen in FIGS. 1 and 3. It is attached to the body 12 above the chamber 18.

The cover 14 is formed in one single piece. For example, it is made by injection moulding in plastic.

The cover 14 comprise an internal cavity 36 which is separated from the chamber 18 by the membrane 16.

The cavity 36 has an internal diameter D4 measured from the axis. Preferably: 0.8×D1<D4<1.2×D1.

The cavity 36 comprises a bottom 36a which is oriented towards the bottom 18a of the chamber 18.

The cover 14 is generally circular or cylindrical in shape in the example shown. The cavity 36 is defined by a cylindrical surface 36b of the cover 14.

FIG. 3 shows that the cover 14 comprises an annular gorge 38 at its lower end around the cavity 36. The gorge 38 is centred on the axis A when the cover 14 is mounted on the body 12. This gorge 38 is delimited at its internal periphery by an annular tooth 40 and at its external periphery by a cylindrical rim 42.

The tooth 40 is intended to be centred on the axis A. The tooth 40 extends downwardly in a direction parallel to the axis A. The tooth 40 extends in the extension of the aforementioned surface 36b.

The tooth 40 has an internal diameter D4. Furthermore, the tooth 40 here has a height H4 which is measured from the bottom 36a in a direction parallel to the axis A.

Advantageously, the tooth 40 comprises at its internal periphery an internal peripheral edge 40a which is convexly curved and has a radius of curvature greater than or equal to 0.5 mm and preferably greater than or equal to 0.8 mm.

The rim 42 is centred on the axis A. The rim 42 extends downwards in a direction parallel to the axis A.

The rim 42 has an internal diameter D2. Furthermore, the rim 42 has a height H5 which is measured from the bottom 36a in a direction parallel to the axis A.

In the example shown, H5 is greater than H4.

Advantageously, D1 and D4 are close, identical or similar.

When mounting the cover 14 on the body 12, the cover 14 is centred on the axis A and the rim 42 of the cover 14 is mounted around the rim 30 of the body 12. These rims 30, 42 are then attached together for example by welding, and in particular heat welding or laser welding. After heat welding, the gorges 26, 38 can be partially or completely filled with molten material by welding. The laser welding allows the rims 30, 42 to be secured together without filling in the gorges 26, 38.

The membrane 16 is elastically deformable and is preferably made of fluorosilicone and for example FVMQ which is a particularly advantageous material as it allows the membrane 16 to retain its elastic properties over a wide temperature range and in particular at temperatures below 0° C. The temperature range is, for example, from −40° C. to 150° C.

The membrane 16 is interposed between the body 12 and the cover 14. It has a general circular shape centred on the axis A.

The membrane 16 comprises a central portion 16a which has a constant thickness E2 and a peripheral portion 16b which is clamped between the body 12 and the cover 14 to ensure a seal between the chamber 18 and the cavity 36. E2 is for example greater than or equal to 1 mm, preferably greater than or equal to 1.5 mm, and more preferably greater than or equal to 2 mm.

FIG. 2 shows the membrane 16 in an un-deformed and unconstrained state. It can be seen that its central portion 16a is planar or flat. It is also noted that the peripheral portion 16b of the membrane 16 comprises an annular allowance 44, an upper portion of which is received in the gorge 38 of the cover 14 and a lower portion of which is received in the gorge 26 of the body 12.

The annular allowance 44 has an internal diameter D5 and an external diameter D6.

In addition, the peripheral portion 16b of the membrane 16 comprises lugs 46 projecting radially outwards with respect to the axis A. These lugs 46 are distributed around this axis A, preferably regularly, and are advantageously configured to be supported on the rim 30 of the body 12 so as to centre the membrane 16 on the axis A.

The central portion 16a of the membrane 16 comprises a first portion 16a1 in the centre and a second portion 16a2 around the first portion 16a. The first portion 16a has an external diameter D7 and the second portion has an external diameter D8.

Furthermore, the central portion 16a comprises two opposite and parallel circular faces, respectively upper and lower.

Looking at FIGS. 1 and 2, it can be seen that the clamping teeth 28, 40 are configured to clamp and pinch the junction between the central portion 16a and the peripheral portion 16b of the membrane 16 between them. The clamping extends in a radial direction from the internal diameters D1, D4 of the teeth 28, 40 to the external diameters of these teeth 28, 40 or to the internal diameter D5 of the allowance 44. Since D1 and D4 are identical (D1=D4) or close (0.8× D1<D) 4<1.2×D1), D1 can be considered the clamping internal diameter of the membrane 16.

The device 10 further comprises a spring 48 and a cup 50 which are housed in the cavity 36.

The spring 48 is centred on the axis A and is here a helical spring. The spring 48 has an upper end 48a which is supported on the bottom 36a of the cavity 36 and which can be centred on the bottom 36a by form-fitting cooperation with a complementary segment of this bottom 36a. The spring 48 further comprises a lower end 48b which is supported on the cup 50 which is interposed between the spring 48 and the upper face of the membrane 16. The cup 50 is centred on the axis A and may also comprise a complementary segment of the lower end 48b of the spring 48 to centre it on the axis A.

The spring 48 has an external diameter D9 and the cup 50 has an external diameter D10. Preferably 0.8×D9<D10<1.2× D9 and/or 0.8×D3<D9<1.2×D3 and/or 0.8×D3<D10<1.2× D3.

It can be seen in FIG. 1 that the membrane 16 is constrained and deformed by the spring 48 so that its first portion 16a1 is planar and is supported on the upper end of the member 32, and its second portion 16a2 is frustoconical. The second portion 16a2 flares from bottom to top.

According to the invention, D1 is greater than 1.5×D3, preferably D1 is greater than 1.8×D3, more preferably D1 is greater than 2×D3. For example, D1 is equal to 2.2×D3. This allows the membrane 16 to have a good elastic deformation capacity because a large portion of it is free to deform elastically without being supported on a part or biased by a part.

FIG. 6 shows the device 10 of FIG. 1 in use. The arrows show the circulation of the fluid and for example of the fuel from the inlet port 12a to the outlet port 12b. At the level of the chamber 18, there is an attenuation of the pressure peaks due to the load losses generated by the support member 32. When the pressure of the fluid exceeds a certain threshold, which is a function of the deformation capacity of the membrane 16 and the stiffness of the spring 48, the spring 48 compresses and the membrane 16 deforms away from the member 32. In other words, when the fluid pressure is below the above-mentioned threshold, the membrane 16 remains constrained by the spring 48 and supported on the support member 32. When a pressure peak occurs in the device 10, the membrane 16 is constrained by the fluid and deforms. The truncation of the membrane 16 and in particular of its second portion 16a2 can then be reversed. The compression of the spring 48 and the deformation of the membrane 16 then dampen the peak pressure of the fluid above the aforementioned threshold.

FIGS. 7 and 8 illustrate a variant embodiment of the device 10 according to the invention which differs from that described herein essentially in that its body 12 comprises a slide system 52.

In the example shown, this slide system 52 is located under the body 12, just below the bottom 18a of the chamber 18. This slide system 52 comprises, for example, two parallel lateral hooks 54 which are generally L- or C-shaped and which define openings 56 facing each other.

The device 10 further comprises a connection element 58 shown alone in FIG. 9. This connection element 58 is formed in one single piece and comprises two attachment portions 58a, 58b. The first attachment portion 58a is configured to cooperate by sliding with the slide system 52 and comprises for example a rail 60 configured to be engaged between the hooks 54 and in particular in their openings 56.

The second attachment portion 58b comprises one or more elastic snap-fit tabs 62.

FIG. 8 shows the device 10 of FIG. 7 attached to a support plate 64 by means of the connection element 58 of FIG. 9. The plate 64 has a general inverted U or 22 shape and comprises an upper wall 64a equipped with an orifice 66 in which the second attachment portion 58b of the connection element 58 is engaged. The tabs 62 cooperate by elastic snap-fitting with the edges of this orifice 66 and ensure the retention of the connection element 58 in the orifice 66. Prior to or after mounting the connection element 58 on the plate 64, the rail 60 of the connection element 58 can be engaged by sliding into the hooks 54 of the slide system 52. The device 10 is then maintained securely on the plate 64 and can be released if required by manually operating the tabs 62 and removing the connection element 58 from the plate 64, or removing the rail 60 from the hooks 54 of the device 10.

The device 10 can thus be mounted in environments with high integration constraints.

The invention claimed is:

1. A pressure damping device for a fluid circuit, the device comprising:
    a lower body comprising fluid inlet and outlet ports which are connected to a chamber located between the inlet and outlet ports, the body being formed in one single piece and the chamber comprising a first bottom,
    an upper cover attached to the body above the chamber, the cover comprising an internal cavity with a second bottom oriented towards the first bottom of the chamber,
    an elastically deformable membrane interposed between the body and the cover, the membrane being substantially circular in shape and comprising a central portion which has a constant thickness and a peripheral portion which is clamped between the body and the cover to ensure a seal between the chamber and the cavity,
    a circular cup arranged in the cavity and on the central portion of the membrane, and
    a spring interposed between the cup and the second bottom of the cavity,
    wherein the body comprises a support member for supporting the membrane, the support member projecting from the first bottom and comprising a free upper end on which the membrane is adapted to be supported, and in which:
the member extends from the first bottom along a central axis to a member height which is less than or equal to a height of the chamber, the member having a circular outline and having an external diameter D3 measured with respect to said axis,
the cup is centered on said axis and has an external diameter D10 measured with respect to said axis, with 0.8×D3<D10<1.2×D3, and
the membrane is centered on said axis and the peripheral portion has a clamping internal diameter D1 measured with respect to said axis, with D1>1.5×D3; and
wherein the member comprises a tubular wall centered on said axis and having at least two radial notches.

2. The device according to claim 1, wherein the member is substantially tubular in shape centered on said axis.

3. The device according to claim 2, wherein the member comprises a tubular wall centered on said axis and having a radial thickness less than or equal to the thickness of the central portion of the membrane.

4. The device according to claim 3, wherein the tubular wall comprises at least two radial notches.

5. The device according to claim 4, wherein the notches are diametrically opposed and/or extend over the entire member height.

6. The device according to claim 4, wherein the inlet and outlet ports are diametrically opposed with respect to said axis and aligned on a further axis, said notches being offset with respect to the further axis.

7. The device according to claim 1, wherein the membrane is constrained and deformed by the spring to comprise a first portion at a center which is planar and is supported on said member, and a second portion around the first portion which is frustoconical.

8. The device according to claim 1, wherein the cavity has an internal diameter D4 measured with respect to the axis, and the chamber has an internal diameter D1 measured with respect to the axis, with 0.8×D3<D4<1.2×D3 0.8×D1<D4<1.2×D1.

9. The device according to claim 1, wherein the cover comprises a first annular tooth for clamping the membrane, the first tooth comprising an inner peripheral edge located on the side of said axis, which is rounded and has a radius of curvature greater than 0.5 mm and/or the body comprises a second annular clamping tooth of the membrane, the second tooth comprising an inner peripheral edge located on the side of said axis, which is rounded and has a radius of curvature greater than 0.1 mm.

10. The device according to claim 1, wherein the peripheral portion of the membrane comprises an annular allowance, an upper portion of which is received in an annular gorge of the cover and a lower portion of which is received in an annular gorge of the body.

11. The device according to claim 1, wherein the peripheral portion of the membrane comprises lugs projecting radially outwards with respect to said axis, the lugs being distributed around the axis.

12. The device according to claim 1, wherein the central portion of the membrane is planar in an unconstrained state.

13. The device according to claim 1, wherein the central portion of the membrane has a thickness greater than or equal to 1 mm.

14. The device according to claim 1, wherein the membrane is made of FVMQ.

15. The device according to claim 1, wherein the body comprises a slide system, the device further comprising a connection element which is formed in one single piece and comprises two attachment portions, the first attachment portion being configured to cooperate by sliding with the slide system of the body, and the second attachment portion comprising at least one elastic snap-fit tab.

16. A fuel circuit for a vehicle, comprising at least one device according to claim 1.

17. The device according to claim 1, wherein the central portion of the membrane has a thickness greater than or equal to 1.5 mm.

18. The device according to claim 1, wherein the central portion of the membrane has a thickness greater than or equal to 2.0 mm.

19. A pressure damping device for a fluid circuit, the device comprising:
a lower body comprising fluid inlet and outlet ports which are connected to a chamber located between the inlet and outlet ports, the body being formed in one single piece and the chamber comprising a first bottom,
an upper cover attached to the body above the chamber, the cover comprising an internal cavity with a second bottom oriented towards the first bottom of the chamber,
an elastically deformable membrane interposed between the body and the cover, the membrane being substantially circular in shape and comprising a central portion which has a constant thickness and a peripheral portion which is clamped between the body and the cover to ensure a seal between the chamber and the cavity,
a circular cup arranged in the cavity and on the central portion of the membrane, and
a spring interposed between the cup and the second bottom of the cavity,
wherein the body comprises a support member for supporting the membrane, the support member projecting from the first bottom and comprising a free upper end on which the membrane is adapted to be supported,
wherein:
the member extends from the first bottom along a central axis to a member height which is less than or equal to a height of the chamber, the member having a circular outline and having an external diameter D3 measured with respect to said axis,
the cup is centered on said axis and has an external diameter D10 measured with respect to said axis, with 0.8×D3<D10<1.2×D3, and
the membrane is centered on said axis and the peripheral portion has a clamping internal diameter D1 measured with respect to said axis, with D1>1.5×D3, and
wherein D3 is between 5 mm and 30 mm, or D1 is between 10 and 60 mm, or D10 is between 5 and 30 mm.

20. A pressure damping device for a fluid circuit, the device comprising:
a lower body comprising fluid inlet and outlet ports which are connected to a chamber located between the inlet and outlet ports, the body being formed in one single piece and the chamber comprising a first bottom,
an upper cover attached to the body above the chamber, the cover comprising an internal cavity with a second bottom oriented towards the first bottom of the chamber,
an elastically deformable membrane interposed between the body and the cover, the membrane being substantially circular in shape and comprising a central portion which has a constant thickness and a peripheral portion which is clamped between the body and the cover to ensure a seal between the chamber and the cavity, a circular cup arranged in the cavity and on the central portion of the membrane, and a spring interposed between the cup and the second bottom of the cavity, wherein the body comprises a support member for supporting the membrane, the support member projecting from the first bottom and comprising a free upper end on which the membrane is adapted to be supported, wherein:

the member extends from the first bottom along a central axis to a member height which is less than or equal to a height of the chamber, the member having a circular outline and having an external diameter $D3$ measured with respect to said axis, the cup is centered on said axis and has an external diameter $D10$ measured with respect to said axis, with $0.8 \times D3 < D10 < 1.2 \times D3$, and the membrane is centered on said axis and the peripheral portion has a clamping internal diameter $D1$ measured with respect to said axis, with $D1 > 1.5 \times D3$, and wherein said support member has a first height measured from said first bottom which is less than a second height of said chamber measured from said first bottom so that the membrane adopts a first shape in the deformed state when the membrane is supported on the free upper end of the support member, said first shape having a frustoconical portion which flares from said first bottom to the upper cover.

* * * * *